(12) United States Patent
Lohmann et al.

(10) Patent No.: US 12,398,265 B2
(45) Date of Patent: Aug. 26, 2025

(54) METHOD FOR PREPARING A (CO)POLYESTER

(71) Applicant: BASF SE, Ludwigshafen am Rhein (DE)

(72) Inventors: Jerome Lohmann, Ludwigshafen am Rhein (DE); Maximilian Lehenmeier, Ludwigshafen am Rhein (DE); Norbert Effen, Ludwigshafen am Rhein (DE); Martin Bussmann, Ludwigshafen am Rhein (DE); Michael Bernhard Schick, Ludwigshafen am Rhein (DE); Timo Benjamin Witt, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 805 days.

(21) Appl. No.: 17/311,177

(22) PCT Filed: Dec. 5, 2019

(86) PCT No.: PCT/EP2019/083845
§ 371 (c)(1),
(2) Date: Jun. 4, 2021

(87) PCT Pub. No.: WO2020/115221
PCT Pub. Date: Jun. 11, 2020

(65) Prior Publication Data
US 2022/0033645 A1    Feb. 3, 2022

(30) Foreign Application Priority Data

Dec. 6, 2018  (EP) ..................... 18210704

(51) Int. Cl.
*C08L 67/02* (2006.01)

(52) U.S. Cl.
CPC ......... *C08L 67/02* (2013.01); *C08L 2205/025* (2013.01); *C08L 2205/03* (2013.01)

(58) Field of Classification Search
CPC ... C08L 67/02; C08L 2205/05; C08L 2205/03
USPC ...................................... 524/539
See application file for complete search history.

(56) References Cited

U.S. PATENT DOCUMENTS

| | | | |
|---|---|---|---|
| 2008/0081886 A1 | 4/2008 | Yamamoto et al. |
| 2012/0112374 A1 | 5/2012 | Ohtani et al. |
| 2017/0369638 A1 | 12/2017 | Alidedeoglu et al. |
| 2020/0362101 A1 | 11/2020 | Lehenmeier et al. |
| 2020/0362103 A1 | 11/2020 | Lehenmeier et al. |

FOREIGN PATENT DOCUMENTS

| | | |
|---|---|---|
| CN | 102455613 A | 5/2012 |
| CN | 103012761 A | 4/2013 |
| CN | 107567470 A | 1/2018 |
| CN | 111372971 A | 7/2020 |
| CN | 111372972 A | 7/2020 |
| EP | 0539541 A1 | 5/1993 |
| EP | 0575349 A1 | 12/1993 |
| EP | 0652910 A1 | 5/1995 |
| EP | 0937120 A2 | 8/1999 |
| EP | 0947559 A2 | 10/1999 |
| EP | 0965615 A1 | 12/1999 |
| EP | 2228399 A1 | 9/2010 |
| EP | 2623540 A1 | 8/2013 |
| JP | 2003-212984 A | 7/2003 |
| WO | 96/15173 A1 | 5/1996 |
| WO | 98/12242 A1 | 3/1998 |
| WO | 2005/017034 A1 | 2/2005 |
| WO | 2006/074815 A1 | 7/2006 |
| WO | 2007/052847 A1 | 5/2007 |
| WO | 2009/127556 A1 | 10/2009 |
| WO | 2010/034685 A2 | 4/2010 |
| WO | 2010/034689 A1 | 4/2010 |
| WO | 2010/034710 A1 | 4/2010 |
| WO | 2010/034711 A1 | 4/2010 |
| WO | 2010/034712 A1 | 4/2010 |
| WO | 2010/077133 A1 | 7/2010 |
| WO | 2011/045293 A1 | 4/2011 |
| WO | 2011/054786 A1 | 5/2011 |
| WO | 2011/086030 A2 | 7/2011 |
| WO | 2012/055796 A1 | 5/2012 |
| WO | 2012/113744 A1 | 8/2012 |
| WO | 2012/152820 A1 | 11/2012 |
| WO | 2013/000847 A1 | 1/2013 |
| WO | 2013/000892 A1 | 1/2013 |
| WO | 2013/017431 A1 | 2/2013 |
| WO | 2013/062408 A1 | 5/2013 |

(Continued)

OTHER PUBLICATIONS

English Translation of WO2009127556 (Year: 2009).*
European Search Report for EP Patent Application No. 18210704.5, Issued on Jun. 18, 2019, 3 pages.
International Preliminary Report on Patentability received for PCT Patent Application No. PCT/EP2019/083845, mailed on Jun. 17, 2021, 12 pages (7 pages of English Translation and 5 pages of Original Document).

(Continued)

*Primary Examiner* — Ling Siu Choi
*Assistant Examiner* — Andrea Wu
(74) *Attorney, Agent, or Firm* — Faegre Drinker Biddle & Reath LLP

(57) ABSTRACT

The present invention relates to a process for producing a (co)polyester, wherein the (co)polyester at least partially consists of 1,4-butylene dicarboxylate units, in a degassing plant, wherein the crude (co)polyester is degassed in the presence of 0.1% to 5% by weight, based on the total weight of the input materials, of an entraining agent at a pressure between 5 to 300 mbar.

24 Claims, No Drawings

(56) References Cited

FOREIGN PATENT DOCUMENTS

| WO | 2014/075997 A1 | 5/2014 |
| WO | 2014/075998 A1 | 5/2014 |
| WO | 2015/169659 A1 | 11/2015 |
| WO | 2015/169660 A1 | 11/2015 |
| WO | 2017/148931 A1 | 9/2017 |
| WO | 2018/114215 A1 | 6/2018 |
| WO | 2018/233888 A1 | 12/2018 |
| WO | 2019/034515 A1 | 2/2019 |
| WO | 2019/034517 A1 | 2/2019 |

OTHER PUBLICATIONS

International Search Report and Written Opinion received for PCT Patent Application No. PCT/EP2019/083845, mailed on Feb. 3, 2020, 14 pages (6 pages of English Translation and 8 pages of Original Document).

* cited by examiner

METHOD FOR PREPARING A (CO)POLYESTER

CROSS-REFERENCE TO RELATED APPLICATIONS

This application is a national stage application (under 35 U.S.C. § 371) of PCT/EP2019/083845, filed Dec. 5, 2019, which claims benefit of European Application No. 18210704.5, filed Dec. 6, 2018, both of which are incorporated herein by reference in their entirety.

The present invention relates to a process for producing a (co)polyester, wherein the (co)polyester at least partially consists of 1,4-butylene dicarboxylate units, in a degassing plant, wherein the crude (co)polyester is degassed in the presence of 0.1% to 5% by weight, based on the total weight of the input materials, of an entraining agent preferably continuously with an average residence time of 0.1 to 2 minutes and at a pressure between 5 to 300 mbar.

The present invention especially relates to a process for producing a polymer mixture comprising one or more (co)polyesters at least partially constructed from 1,4-butylene dicarboxylate units in a degassing plant which simultaneously functions as a mixing unit, wherein the crude (co)polyester is mixed and degassed optionally with further polymers and auxiliaries in the presence of 0.1% to 5% by weight, based on the total weight of the polymer mixture, of an entraining agent—preferably water—preferably continuously with an average residence time of 0.1 to 2 minutes and a pressure between 0.1 to 300 mbar—preferably 5 to 100 mbar.

Processes for continuous production of polyesters such as polybutylene succinate (PBS), polybutylene succinate-co-adipate (PBSA) or polybutylene succinate-co-sebacate (PBSSe) are known from the literature (see WO-A 2009/127556 and EP-A 2228399). These documents describe the depletion of tetrahydrofuran (THF) formed. However, the processes described in these documents do not result in sufficient depletion of the THF to obtain approval for contact with foodstuffs according to EU 10/2011.

WO 2017/148931 describes a process for depletion of THF in polymer mixtures comprising one or more (co)polyesters at least partially constructed from 1,4-butylene dicarboxylate units. The polymer mixture formed is subjected to an air flow at high pressures and elevated temperatures for several days. This process is not completely convincing in terms of space-time yield and energy efficiency.

The present invention accordingly has for its object to provide an efficient and practicable process for producing low-THF (co)polyesters or a polymer mixture comprising one or more (Co)polyesters, wherein the (co)polyester at least partially consists of 1,4-butylene dicarboxylate units, which does not exhibit the above-described disadvantages.

The inventors have surprisingly found a process wherein a crude (co)polyester is degassed in the presence of 0.1% to 5% by weight, based on the total weight of the crude (co)polyester, of an entraining agent in a degassing plant at a pressure between 5 to 300 mbar.

This process is substantially more efficient than a corresponding process at identical pressure but in the absence of an entraining agent such as preferably water.

One interesting variant is the process for producing a polymer mixture comprising one or more (co)polyesters at least partially constructed from 1,4-butylene dicarboxylate units in a degassing plant which simultaneously functions as a mixing unit, wherein the crude (co)polyester is mixed and degassed optionally with further polymers and auxiliaries in the presence of 0.1% to 5% by weight, based on the total weight of the polymer mixture, of an entraining agent—preferably water—at a pressure between 0.1 to 300 mbar—preferably 5 to 100 mbar.

The invention is more particularly described hereinbelow.

The term (co)polyesters is to be understood as meaning i) aliphatic polyesters and copolyesters, ii) aliphatic-aromatic copolyesters and iii) aromatic polyesters, each of which are at least partially constructed from 1,4-butylenedicarboxylate units. The aliphatic and aliphatic-aromatic (co)polyesters biodegradable according to DIN EN 13432 are particularly preferred.

Aliphatic (co)polyesters i) are to be understood as meaning those polyesters and copolyesters predominantly constructed from monomeric aliphatic dicarboxylic acids and 1,4-butanediol.

Contemplated aliphatic dicarboxylic acids or ester-forming derivatives thereof in general include those having 2 to 40 carbon atoms, preferably 4 to 14 carbon atoms. They may preferably be linear or branched. The cycloaliphatic dicarboxylic acids usable in the context of the present invention are generally those having 7 to 10 carbon atoms and in particular those having 8 carbon atoms. However, it is also possible in principle to employ dicarboxylic acids having a greater number of carbon atoms, for example having up to 30 carbon atoms.

These include for example: malonic acid, succinic acid, glutaric acid, 2-methylglutaric acid, 3-methylglutaric acid, adipic acid, pimelic acid, suberic acid, azelaic acid, sebacic acid, undecanedioic acid, dodecanedioic acid, brassylic acid, tetradecanedioic acid, fumaric acid, 2,2-dimethylglutaric acid, suberic acid, dimer fatty acid (for example Empol® 1061 from BASF SE), 1,3-cyclopen-tanedicarboxylic acid, 1,4-cyclohexanedicarboxylic acid, 1,3-cyclohexanedicarboxylic acid, diglycolic acid, itaconic acid, maleic acid, maleic anhydride and 2,5-norbornanedicarboxylic acid.

Likewise employable ester-forming derivatives of the abovementioned aliphatic or cycloaliphatic dicarboxylic acids include in particular di-$C_1$- to $C_6$-alkyl esters, such as dimethyl, diethyl, di-n-propyl, diisopropyl, di-n-butyl, diisobutyl, di-t-butyl, di-n-pentyl, diisopentyl or di-n-hexyl esters. Anhydrides of the dicarboxylic acids may likewise be employed.

These dicarboxylic acids or the ester-forming derivatives thereof may be used here individually or as a mixture of two or more thereof.

It is preferable to employ succinic acid, adipic acid, azelaic acid, sebacic acid, brassylic acid or their respective ester-forming derivatives or mixtures thereof. It is particularly preferable to employ succinic acid, adipic acid or sebacic acid or their respective ester-forming derivatives or mixtures thereof. It is particularly preferable to employ succinic acid or mixtures of succinic acid with preferably up to 25 mol % of adipic acid or preferably up to 10 mol % of sebacic acid or their ester-forming derivatives, such as their alkyl esters.

Succinic acid, azelaic acid, sebacic acid and brassylic acid additionally have the advantage that they are obtainable as renewable raw materials.

Generally 1,4-butanediol is used as the aliphatic diol.

Preference is given to aliphatic (co)polyesters i comprising the components:
  i-a) 80 to 100 mol %, based on the components i-a to i-b, of succinic acid;
  i-b) 0 to 20 mol %, based on the components i-a to i-b, of one or more dicarboxylic acids selected from; adipic acid, azelaic acid, sebacic acid or brassylic acid;

i-c) 99 to 100 mol %, based on the components i-a to i-b, of 1,4-butanediol;

i-d) 0% to 1% by weight, based on the components i-a to i-c, of a chain extender and/or branching agent.

The polyesters i-a to i-d generally comprise 0% to 2% by weight, preferably 0.05% to 1.0% by weight and especially preferably 0.1% to 0.3% by weight, based on the total weight of the polyester i, of a branching agent and/or 0.1% to 1.0% by weight, based on the total weight of the polyester i, of a chain extender. The branching agent is preferably at least a trifunctional alcohol or an at least trifunctional carboxylic acid. Contemplated chain extenders include in particular difunctional isocyanates, isocyanurates, oxazolines, carboxylic anhydride or epoxides.

Particularly preferred branching agents have three to six functional groups. Examples include: tartaric acid, citric acid, malic acid, trimethylolpropane, trimethylolethane, pentaerythritol, polyether triols and glycerol, trimeric acid, trimellitic acid, trimellitic anhydride, pyromellitic acid, and pyromellitic dianhydride. Preference is given to polyols such as trimethylolpropane, pentaerythritol, and especially glycerol. This component makes it possible to construct biodegradable polyesters that have structural viscosity. These biodegradable polyesters are easier to process.

In the context of the present invention a diisocyanate as chain extender is to be understood as meaning especially linear or branched alkylene diisocyanates or cycloalkylene diisocyanates having 2 to 20 carbon atoms, preferably 3 to 12 carbon atoms, for example 1,6-hexamethylene diisocyanate, isophorone diisocyanate or methylenebis(4-isocyanatocyclohexane). Particularly preferred aliphatic diisocyanates are isophorone diisocyanate and in particular 1,6-hexamethylene diisocyanate.

Polyfunctional epoxides as chain extenders are to be understood as meaning in particular an epoxy-containing copolymer based on styrene, acrylic ester and/or methacrylic ester. The epoxy-bearing units are preferably glycidyl (meth)acrylates. Copolymers having a glycidyl methacrylate proportion of greater than 20%, particularly preferably of greater than 30% and especially preferably of greater than 50% by weight of the copolymer have proven advantageous. The epoxy equivalent weight (EEW) in these polymers is preferably 150 to 3000 and especially preferably 200 to 500 g/equivalent. The average molecular weight (weight-average) $M_W$ of the polymers is preferably 2000 to 25 000, in particular 3000 to 8000. The average molecular weight (number-average) $M_n$ of the polymers is preferably 400 to 6000, in particular 1000 to 4000. The polydispersity (Q) is generally between 1.5 and 5. Epoxy-containing copolymers of the abovementioned type are for example marketed by BASF Resins B.V. under the Joncryl® ADR brand. A particularly suitable chain extender is Joncryl® ADR 4468 for example.

In general, it is advisable to add the branching (at least trifunctional) compounds at a comparatively early point in the polymerization.

In addition to the dicarboxylic acids and diols the aliphatic (co)polyesters may comprise further of the following components selected from the group consisting of: dihydroxyl compound and hydroxycarboxylic acid.

Production of polyesters may employ a hydroxycarboxylic acid such as: glycolic acid, D-lactic acid, L-lactic acid, D,L-lactic acid, 6-hydroxyhexanoic acid, cyclic derivatives thereof such as glycolide (1,4-dioxane-2,5-dione), D- or L-dilactide (3,6-dimethyl-1,4-dioxane-2,5-dione), p-hydroxybenzoic acid and also their oligomers and polymers such as 3-polyhydroxybutyric acid, polyhydroxyvaleric acid, polylactide (obtainable for example as Ingeo® (NatureWorks) or as Luminy® (Total Corbion)), the low molecular weight and cyclic derivatives thereof being particularly preferable for production of aliphatic polyesters.

The hydroxycarboxylic acids may be employed for example in amounts from 0.01% to 50% by weight, preferably from 0.1% to 15% by weight, based on the amount of the monomers.

Aliphatic (co)polyesters i are to be understood as meaning in particular polybutylene succinate (PBS), polybutylene adipate (PBA), polybutylene succinate-co-adipate (PBSA), polybutylene succinate-co-sebacate (PBSSe), polybutylene sebacate (PBSe) or corresponding polyesteramides or polyesterurethanes. Aliphatic polyesters are marketed, for example, by Showa Highpolymers under the name Bionolle and by Mitsubishi under the name GS-Pla or BioPBS. More recent developments are described in WO 2010/034711.

The (co)polyesters i generally have a number-average molecular weight (Mn) in the range from 5000 to 100000, in particular in the range from 10000 to 75000 g/mol, preferably in the range from 15000 to 40000 g/mol, a weight-average molecular weight (Mw) of 30000 to 300000, preferably 60000 to 200000 g/mol, and an Mw/Mn ratio of 1 to 6, preferably 2 to 4. The viscosity number according to ISO 1628-5 (measured in a 0.05 g/ml solution of phenol/o-dichlorobenzene (1:1)) is between 30 and 450, preferably from 100 to 400 ml/g (measured in o-dichloroben-zene/phenol (50/50 weight ratio)). The melting point is in the range from 85 to 130, preferably in the range from 95° C. to 120° C.

The MVR (melt volume rate) according to EN ISO 1133 (190° C., 2.16 kg weight) is generally 0.1 to 150 cm$^3$/10 min, preferably 2 to 150 cm$^3$/10 min prior to chain extension. The acid numbers according to DIN EN 12634 are generally 0.01 to 3 mg KOH/g, preferably 0.1 to 1.0 mg KOH/g and especially preferably 0.1 to 0.7 mg KOH/g.

Aliphatic-aromatic copolyesters ii are to be understood as meaning linear, chain-extended and optionally branched and chain-extended copolyesters, as described for example in WO 96/15173 to 15176 or in WO 98/12242 which are hereby explicitly incorporated by reference. Mixtures of different semiaromatic polyesters are likewise contemplated. Interest in recent developments are based on renewable raw materials (see WO2010/034689). Polyesters ii are in particular to be understood as meaning products such as ecoflex® (BASF SE).

Preferred copolyesters ii include copolyesters comprising as essential components:

ii-a) 30 to 70 mol %, preferably 40 to 60 mol % and especially preferably 50 to 60 mol %, based on the components ii-a) to ii-b), of an aliphatic dicarboxylic acid or mixtures thereof, preferably: adipic acid, azelaic acid, sebacic acid and brassylic acid, ii-b) 30 to 70 mol %, preferably 40 to 60 mol % and especially preferably 40 to 50 mol %, based on the components ii-a) and ii-b), of an aromatic dicarboxylic acid or mixtures thereof, preferably: terephthalic acid or 2,5-furandicarboxylic acid, ii-c) 99 to 100 mol %, based on the components ii-a) to ii-b), of 1,4-butanediol; and ii-d) 0% to 2% by weight, preferably 0.1% to 1% by weight, based on the components ii-a) to ii-c), of a chain extender, in particular a di- or polyfunctional isocyanate, preferably hexamethylene diisocyanate, and optionally 0.01% to 0.3% by weight of a branching agent, preferably trimethylolpropane, pentaerythritol and in particular glycerol.

Employable aliphatic diacids ii-a include those described hereinabove under the aliphatic (co)polyesters i. These dicarboxylic acids or the ester-forming derivatives thereof may be used here individually or as a mixture of two or more thereof.

It is preferable to employ adipic acid, azelaic acid, sebacic acid, brassylic acid or their respective ester-forming derivatives or mixtures thereof. It is particularly preferable to employ adipic acid or sebacic acid or their respective ester-forming derivatives or mixtures thereof.

The aromatic dicarboxylic acids or the ester-forming derivatives thereof ii-b may be used individually or as a mixture of two or more thereof. It is particularly preferable to employ terephthalic acid or 2,5-furandicarboxylic acid or the ester-forming derivatives thereof.

The diol ii-c employed is 1,4-butanediol which is also obtainable as a renewable raw material. It is also possible to use mixtures with other diols.

Generally employed are 0% to 1% by weight, preferably 0.1% to 1.0% by weight and especially preferably 0.1% to 0.3% by weight, based on the total weight of the polyester, of a branching agent and/or 0.05% to 1% by weight, preferably 0.1% to 1.0% by weight, based on the total weight of the co-polyester, of a chain extender (ii-d). Preference is given to the same branching agents and chain extenders (ii-d) as the branching agents and chain extenders (i-d) described in detail hereinabove.

The polyesters ii generally have a number-average molecular weight (Mn) in the range from 5000 to 100000, in particular in the range from 10000 to 75000 g/mol, preferably in the range from 15000 to 38000 g/mol, a weight-average molecular weight (Mw) of 30000 to 300000, preferably 60000 to 200000 g/mol, and an Mw/Mn ratio of 1 to 6, preferably 2 to 4. The viscosity number is between 50 and 450, preferably from 80 to 250 g/ml (measured in o-dichlorobenzene/phenol (50/50 weight ratio)). The melting point is in the range from 85° C. to 150° C., preferably in the range from 95° C. to 140° C.

The MVR (melt volume rate) according to EN ISO 1133-1 DE (190° C., 2.16 kg weight) is generally 1 to 50 cm³/10 min, preferably 1.5 to 25 cm³/10 min. The acid numbers according to DIN EN 12634 are generally 0.01 to 1.2 mg KOH/g, preferably 0.01 to 1.0 mg KOH/g and especially preferably 0.01 to 0.7 mg KOH/g.

Suitable aromatic polyesters iii based on terephthalic acid in particular include commercially available polybutylene terephthalate (PBT).

An aromatic polyester iii based on 2,5-furandicarboxylic acid is for example: Polybutylene-2,5-furandicarboxylate (PBF) which is producible as described in WO2013/062408, WO2010/077133, WO2007/052847.

The abovedescribed low-THF (co)polyesters may be employed in polymer mixtures comprising not only the (co)polyesters but also further polymers, auxiliaries and additives. This is of interest especially for polymer mixtures employed as packaging materials for foodstuffs such as for example coffee capsules, food films, vacuum-packing films, catering cutlery, straws, paper cups coated with the polymer mixtures or foamed or injection molded casings or rinds for sausage, cheese and/or meat or as a toy.

In a preferred embodiment of the process according to the invention the depletion of THF in the compounding step is carried out during production of the polymer mixture. This process variant may also employ (co)polyesters that have not previously been depleted in THF.

Preferred polyester mixtures comprise:
i) 5% to 95% by weight, preferably 20% to 80% by weight, in each case based on the polyester mixture, of one or more of the abovedescribed aliphatic and aliphatic-aromatic (co)polyesters,
ii) 95% to 5% by weight, preferably 80% to 20% by weight, in each case based on the polyester mixture, of at least one or more components selected from the group consisting of: polycaprolactone, starch, thermoplastic starch, cellulose, polyhydroxyalkanoate, polyglycolic acid and polylactic acid.
iii) 0% to 40% by weight, preferably 10% to 30% by weight, in each case based on the polyester mixture, of at least one or more fillers selected from the group consisting of talc, calcium carbonate, kaolin, mineral fibers.

It is preferable to employ polylactic acid having the following profile of properties:
a melt volume rate (MVR) according to EN ISO 1133 (190° C., 2.16 kg weight) of 0.5 to 50, in particular 2 to 40, cm³/10 min)
a melting point below 240° C.;
a glass transition temperature (Tg) greater than 55° C.
a water content of less than 1000 ppm
a residual monomer content (lactide) of less than 0.3%
a molecular weight of greater than 80 000 Dalton.

Preferred polylactic acids are for example Ingeo® 8052D, 6201D, 6202D, 6251D and in particular Ingeo® 4020D, 4032D, 4043D or 3251D (polylactic acid from NatureWorks) or Luminy LX175, Luminy L105 (polylactic acid from Total Corbion)

The term polyhydroxyalkanoates is primarily to be understood as meaning poly-4-hydroxybutyrates and poly-3-hydroxybutyrates and copolyesters of the abovementioned polyhydroxybutyrates with 3-hydroxyvalerate, 3-hydrovhexanoate and/or 3-hydroxyoctanoate. Poly-3-hydroxybutyrates are marketed for example by PHB Industrial under the brand Biocycle® and by Tianan under the name Enmat®.

Poly-3-hydroxybutyrate-co-4-hydroxybutyrates are known from Metabolix in particular. They are sold under the trade name Mirel®.

Poly-3-hydroxybutyrate-co-3-hydroxyhexanoates are known from P&G or Kaneka. Poly-3-hy-droxybutyrate-co-3-hydroxyhexanoates generally have a 3-hydroxyhexanoate proportion of 1 to 20 and preferably of 3 to 15 mol % based on the polyhydroxyalkanoate. The polyhydroxyalkanoates generally have a molecular weight Mw of 100 000 to 1 000 000 and preferably of 300 000 to 600 000.

Starch is to be understood as also including amylose; thermoplasticized is to be understood as meaning thermoplasticized with plasticizers such as glycerol, sorbitol or water for example (see EP-A 539 541, EP-A 575 349, EP-A 652 910) or else surface modified (see EP-A 937120, EP-A 947559, EP-A 965615). Polymer mixtures according to the invention comprising 10% to 35% by weight, based on the total weight of the polymer mixture, of thermoplastic or non-thermoplastic starch exhibit not only good degradability in the soil but also good mechanical properties such as in particular a high tear propagation resistance. These starch-containing mixtures are therefore an interesting alternative to the abovementioned filler-containing (calcium- and/or talc-containing) polymer mixtures, optionally also in combination with the filler-containing polymer mixtures.

The polyesters or polyester mixtures according to the invention may also comprise further additives known to those skilled in the art. Examples include the additives customary in the plastics industry such as stabilizers; nucleating agents; lubricants and release agents such as stearates (especially calcium stearate); plasticizers, for example citric esters (especially acetyl tributyl citrate), glyceryl esters such as triacetylglycerol or ethylene glycol derivatives; surfactants such as polysorbates, palmitates or laurates; waxes, for example erucamide, stearamide or behenamide, beeswax or beeswax esters; antistats, UV absorbers; UV stabilizers; antifogging agents or dyes.

The additives are used in concentrations of 0% to 2% by weight, in particular 0.1% to 2% by weight, based on the inventive polyester or the polyester mixture. Plasticizers may be present in amounts of 0.1% to 10% by weight based on the inventive polyester or the polyester mixture.

It is also possible to add to the polymer mixtures, in particular the polylactic acid-containing mixtures, 0 to 1% by weight, preferably 0.01 to 0.8% by weight, particularly preferably 0.05 to 0.5% by weight, based on the total weight of the components i to vi, of an epoxy-containing copolymer based on styrene, acrylic ester and/or methacrylic ester. The epoxy-bearing units are preferably glycidyl (meth)acrylates. Copolymers having a glycidyl methacrylate proportion of greater than 20%, particularly preferably of greater than 30% and especially preferably of greater than 50% by weight of the copolymer have proven advantageous. The epoxy equivalent weight (EEW) in these polymers is preferably 150 to 3000 and especially preferably 200 to 500 g/equivalent. The average molecular weight (weight-average) $M_w$ of the polymers is preferably 2000 to 25 000, in particular 3000 to 8000. The average molecular weight (number-average) $M_r$ of the polymers is preferably 400 to 6000, in particular 1000 to 4000. The polydispersity (Q) is generally between 1.5 and 5. Epoxy-containing copolymers of the abovementioned type are for example marketed by BASF Resins B.V. under the brand Joncryl® ADR. Joncryl® ADR 4468 is particularly suitable. Component v is employed especially in PLA-containing polyester mixtures.

The polyesters and polyester mixtures according to the invention may preferably comprise the following fillers.

Calcium carbonate may be employed for example at 10% to 25% by weight, preferably 10% to 20% by weight, particularly preferably 12% to 18% by weight, based on the total weight of the polymer mixture. Calcium carbonate from Omya, inter alia, has proven suitable. The calcium carbonate generally has an average particle size of 0.5 to 10 micrometers, preferably 1-5 and particularly preferably 1-2.5 micrometers.

Talc may be employed for example at 3% to 40% by weight, preferably 5% to 30% by weight, particularly preferably 15% to 30% by weight, based on the total weight of the polymer mixture. Talc from Mondo Minerals, inter alia, has proven suitable. The talc generally has an average particle size of 0.5-10, preferably 1-8, particularly preferably 1-3 micrometers.

Yet further minerals that may be present in addition to the fillers calcium carbonate and talc include: graphite, gypsum, carbon black, iron oxide, calcium chloride, kaolin, silica (quartz), sodium carbonate, titanium dioxide, silicate, wollastonite, mica, montmorillonites, mineral fibers such as glass fibers and natural fibers.

Natural fibers generally include cellulose fibers, kenaf fibers, hemp fibers, wood flour, and potato peelings. These are preferably employed at 1% to 20% by weight based on the polymer mixture.

The minerals including the fillers calcium carbonate and talc may also be employed as nanofillers. Nanofillers are, in particular, finely divided phyllosilicates, preferably argillaceous minerals, particularly preferably montmorillonite comprising argillaceous minerals, whose surface has been modified with one or more quaternary ammonium salts and/or phosphonium salts and/or sulfonium salts. Preferred argillaceous minerals are natural montmorillonites and bentonites.

Fillers may altogether be added to the polyester mixtures for example at 5% to 35% by weight based on the total weight of the polymer mixture.

The low-THF (co)polyesters obtainable by the process according to the invention such as for example PBS are alone or in polymer mixtures suitable for numerous applications such as injection molded products, thermoforming products, films or foams. The (co)polyesters are often employed in mixtures with further biopolymers such as polylactic acid, polyhydroxyalkanoates, biodegradable aliphatic-aromatic polyesters, starch, thermoplastic starch, mineral fillers or other additives such as for example lubricants, nucleating agents, plasticizers or pigments.

It is preferable when production of the polymer mixtures described in the following specifications utilizes the process according to the invention: WO 2005/017034, WO 2006/074815, WO 2010/034685, WO 2010/034710, WO 2010/034711, WO 2010/034712, WO 2011/045293, WO 2011/054786, WO 2011/086030, WO 2012/055796, WO 2012/113744, WO 2012/152820, WO 2013/000847, WO 2013/000892, WO 2013/017431, WO 2014/075997, WO 2014/075998, WO 2015/169659, WO 2015/169660, WO 2018/114215, PCT/EP2018/058735, PCT/EP2018/071601, PCT/EP2018/071607.

The preferred aliphatic and aliphatic-aromatic (co)polyesters and the polyester mixtures comprising these are biodegradable.

In the context of the present invention, the feature "biodegradable" is satisfied for a substance or a substance mixture if this substance or the substance mixture shows a percentage degree of biodegradation according to DIN EN 13432 of at least 90%.

Biodegradability generally results in the polyester (mixtures) breaking down within an appropriate and verifiable timeframe. Degradation can take place enzymatically, hydrolytically, oxidatively, and/or by the action of electromagnetic radiation, for example UV radiation, and is usually predominantly effected by the action of microorganisms such as bacteria, yeasts, fungi, and algae. Biodegradability is quantifiable, for example, by mixing polyesters with compost and storing them for a certain time. For example, according to DIN EN 13432, $CO_2$-free air is passed through matured compost during composting and said compost is subjected to a defined temperature program. Biodegradability is here defined via the ratio of the net $CO_2$ release from the sample (after subtraction of the $CO_2$ released by the compost without a sample) to the maximum $CO_2$ release from the sample (calculated from the carbon content of the sample) as a percentage degree of biodegradation. Biodegradable polyester (mixtures) generally show clear signs of degradation such as fungus growth and tear and hole formation after just a few days of composting.

Other methods for determining biodegradability are described for example in ASTM D 5338 and ASTM D 6400.

EU Regulation 10/2011 specifies threshold values for plastics materials that are in contact with food products. Packaging materials made of non-purified aliphatic polyesters such as polybutylene succinate (PBS) do not meet the requirements of this standard and are therefore unsuitable for foodstuffs applications. Especially the cyclic impurities in the polyester such as THF, cyclic monomers, dimers, trimers and tetramers can migrate out of the packaging material under the various test conditions. The process according to the invention now provides aliphatic polyesters which are distinctly depleted in cyclic impurities and which achieve the threshold values required in EU Regulation 10/2011. The process according to the invention has thereby proven more efficient than the processes described in EP-A 228399 and EP-A 2623540.

The process according to the invention is more particularly described hereinbelow:

The (co)polyesters are produced as described in the literature or at the outset.

Described at the outset is the process for producing a (co)polyester, wherein the (co)polyester at least partially consists of 1,4-butylene dicarboxylate units, in a degassing plant, wherein the crude (co)polyester is degassed in the presence of 0.1% to 5% by weight, based on the total weight of the input materials, of an entraining agent preferably continuously with an average residence time of 0.1 to 2 minutes and at a pressure between 5 to 300 mbar.

A preferred embodiment relates to a process for producing a polymer mixture comprising one or more (co)polyesters at least partially constructed from 1,4-butylene dicarboxylate units in a degassing plant which simultaneously functions as a mixing unit, wherein the crude (co)polyester is mixed and degassed optionally with further polymers and auxiliaries in the presence of 0.1% to 5% by weight, based on the total weight of the polymer mixture, of an entraining agent such as preferably water preferably continuously with an average residence time of 0.1 to 2 minutes and at a pressure between 0.1 to 300 mbar—preferably between 5 to 100 mbar.

The mixing and degassing is preferably performed continuously in an extruder, a continuous kneader (List reactor) or a static mixer. Internals that may be employed for example include: in the case of a static mixer SMR, SMX, or SMXL elements or combinations thereof, for example from Sulzer Chemtech AG, Switzerland. Depending on the field of application examples of a List reactor include a single-screw DISCOTHERM B reactor or twin-screw CRP and ORP reactors. Suitable extruders include single-screw or twin-screw extruders.

However, the mixing and degassing may also be performed semi-continuously—for example in a stirred tank cascade—or discontinuously as a batch process—for example in a stirred tank.

The degassing is made more efficient through addition of an entraining agent. A vacuum between 5 and 300 mbar, preferably 5 to 100 mbar and especially preferably of 10 to 60 mbar is established here. The temperatures in the degassing plant are generally at 180° C. to 280° C. and preferably 200° C. to 250° C.

Employable entraining agents include in particular alcohols such as preferably methanol or ethanol optionally also in the form of aqueous alcohol solutions, n-hexane, cyclohexane or acetone. It is particularly preferable to employ water or steam as an entraining agent.

The entraining agent is preferably introduced into the gas space of the degassing plant. This has the advantage that a homogeneous (co)polyester film is formed in the degassing plant and for example blister formation or foaming in the (co)polyester film are avoided. It may also be advantageous to blend a preferably inert carrier gas such as nitrogen, carbon dioxide or air with the entraining agent.

The amount of the entraining agent is generally between 0.1% and 5% by weight, preferably 0.3% to 2% by weight, based on the crude (co)polyester. Greater amounts of entraining agent may result in appreciable degradation of the (co)polyester in the degassing plant. At a lower entraining agent concentration the depletion of the crude polyester in cyclic impurities such as THF may be insufficient.

When using polymer mixtures in the process according to the invention the amount of the entraining agent is generally between 0.1% and 5% by weight, preferably 0.3% to 3% by weight, based on the total weight of the polymer mixture.

In a discontinuous degassing plant a reaction time of below 30 minutes is generally established and in a continuous process such as for example in an extruder an average residence time of 0.1 to 2 minutes is established. Longer residence times would result in intensified degradation of the polycondensed polyester and at shorter residence times the depletion of the impurities such as THF is insufficient. The average residence time may be determined by the volume of the melt in the reactor relative to the outflowing volume flow.

It may also be advantageous to reduce the activity of the reaction catalyst by addition of one-off or further amounts of the above-described deactivators such as for example phosphorous acid.

Suitable degassing plants include not only the preferred twin-screw extruder but also single-screw extruders, kneaders (for example Buss kneaders) and planetary screw extruders.

The process according to the invention makes it possible to achieve a distinct depletion of impurities. In the case of 1,4-butanediol-containing polyesters the residual THF content of the aliphatic polyester may generally be reduced to half or preferably a quarter and especially preferably a tenth of the original THF content. The purified aliphatic polyester generally has a residual THF content of less than 30 ppm, preferably less than 10 ppm and especially preferably less than 1 ppm.

The process according to the invention makes it possible to practicably and efficiently produce (co)polyester polymer mixtures which are low in impurities such as tetrahydrofuran.

Test methods:

Viscosity numbers were determined according to DIN 53728 Part 3, Jan. 3, 1985. The solvent mixture: phenol/dichlorobenzene in a 50/50 weight ratio was employed.

The melt volume flow rate (MVR) was determined according to ISO 1133. Test conditions of 190° C., 2.16 kg were used. The melting time was 4 minutes. The MVR describes the rate of extrusion of a molten plastics molding composition through an extrusion die of defined length and defined diameter under the above-described conditions: temperature, loading and piston position. The volume extruded in a defined time in the barrel of an extrusion plastometer is determined.

Performance testing:

The molecular weights Mn and Mw of the semiaromatic polyesters were determined by SEC according to DIN 55672-1. Eluent: hexafluoroisopropanol (HFIP)+0.05% by weight potassium trifluoroacetate salt; calibration performed with narrow-distribution polymethyl methacrylate standards. Evaluation had to be aborted after 18.83 mL (about M=300 g/mol) since the chromatogram is disrupted by impurities in the sample/in the SEC eluent for smaller molar masses. The melt volume rate MVR was measured at 190° C. and 2.16 kg according to ISO 1133-1 DE.

The oligomers were characterized by gas chromatography coupled with mass spectroscopy (GC-MS). 24.41 mg of sample were dissolved in 1.2 ml of dichloromethane. The ampoule was placed on a tube roller for 30 minutes. Ionization was by positive ions, chemical ionization and electron impact ionization. Individual resolution was employed.

Input materials:
Polyester i-1: GS-PLA® FZ91PD, polybutylene succinate from Mitsubishi Chemical Corp. having an MVR of 4 cm$^3$/10 min
Polyester i-2: BioPBS FZ71PM, polybutylene succinate from Mitsubishi Chemical Corp. having an MVR of 17 cm$^3$/10 min
Copolyester ii-1: Polybutylene sebacate-co-terephthalate from BASF having an MVR of 1 cm$^3$/10 min
Copolyester ii-2: Polybutylene sebacate-co-terephthalate from BASF having an MVR of 9 cm$^3$/10 min
Polymer di-1: IngeoS 4044D, polylactic acid from NatureWorks having an MVR of 3 cm$^3$/10 min
Polymer di-2: IngeoS 3251D, polylactic acid from NatureWorks having an MVR of 30 cm$^3$/10 min
Filler iv-1: Microtalc IT Extra from Mondo Minerals
Lubricant v-1: Erucamide
Entraining agent x: Water Performing the degassing The experiments were carried out on a twin-screw extruder having a diameter of 40 mm and a length of 44D. The average residence time of the melt was 15 seconds to 1 minute. Outlet temperatures were set to 245° C. The water was introduced into the gas space of the extruder. Further parameters are apparent from table 1.

TABLE 1

| Input mat. | Unit | V-1 | V-2 | E3 | V-4 | V-5 | V-6 | E7 |
|---|---|---|---|---|---|---|---|---|
| i-1 | % by weight | 45.0 | 45.0 | 44.8 | | | | |
| i-2 | % by weight | | | | 54.8 | 54.8 | 54.5 | 54.2 |
| ii-1 | % by weight | 10.0 | 10.0 | 9.9 | | | | |
| ii-2 | % by weight | | | | 4.7 | 4.7 | 4.7 | 4.7 |
| iii-1 | % by weight | 15.0 | 15.0 | 14.9 | | | | |
| iii-2 | % by weight | | | | 20.0 | 20.0 | 19.9 | 19.8 |
| iv-1 | % by weight | 30.0 | 30.0 | 29.9 | 20.2 | 20.2 | 20.1 | 20.0 |
| v-1 | % by weight | | | | 0.3 | 0.3 | 0.3 | 0.3 |
| x | % by weight | | | 0.5 | | | 0.5 | 1 |
| Pressure | mbar | 600 | 50 | 50 | 300 | 30 | 30 | 30 |
| THF content | ppm | 40 | 20 | 10 | 3 | 1.5 | 1 | <1 |

The invention claimed is:

1. A process for producing a (co)polyester, wherein a crude (co)polyester comprises 1,4-butylene dicarboxylate units, in a degassing plant, wherein the crude (co)polyester is degassed in the presence of 0.1% to 5% by weight, based on the total weight of the crude (co)polyester, of an added entraining agent at a pressure between 5 to 300 mbar.

2. A process for producing a polymer mixture comprising one or more crude (co)polyester at least partially constructed from 1,4-butylene dicarboxylate units in a degassing plant which simultaneously functions as a mixing unit, wherein the one or more crude (co)polyester are mixed and degassed optionally with further polymers and auxiliaries in the presence of 0.1% to 5% by weight, based on the total weight of the polymer mixture, of an added entraining agent at a pressure between 0.5 to 300 mbar.

3. The process according to claim 1, wherein the added entraining agent is water.

4. The process according to claim 1, wherein the added entraining agent is introduced into the gas space of the degassing plant.

5. The process according to claim 1, wherein the degassing plant is an extruder and degassing is performed with an average residence time of 0.1 to 2 minutes.

6. The process according to claim 1, wherein the degassing plant has an internal temperature of 200° C. to 250° C.

7. The process according to claim 1, wherein degassing is performed in the presence of 0.3% to 2% by weight, based on the total weight of the crude (co)polyester, of the added entraining agent water.

8. The process according to claim 2, wherein degassing is performed in the presence of 0.3% to 3% by weight, based on the total weight of the polymer mixture, of the added entraining agent water.

9. The process according to claim 1, wherein the (co)polyester is a polybutylene succinate, polybutylene succinate-co-adipate, polybutylene succinate-co-sebacate, polybutylene adipate-co-terephthalate and/or polybutylene sebacate-co-terephthalate.

10. The process according to claim 1, wherein degassing is performed at a pressure between 5 and 100 mbar.

11. The process according to claim 2, wherein the produced polymer mixture has a residual THE content of less than 10 ppm.

12. The process according to claim 2, wherein the added entraining agent is water.

13. The process according to claim 2, wherein the added entraining agent is introduced into the gas space of the degassing plant.

14. The process according to claim 2, wherein the degassing plant is an extruder and degassing is performed with an average residence time of 0.1 to 2 minutes.

15. The process according to claim 2, wherein the degassing plant has an internal temperature of 200° C. to 250° C.

16. The process according to claim 2, wherein the (co)polyester is a polybutylene succinate, polybutylene succinate-co-adipate, polybutylene succinate-co-sebacate, polybutylene adipate-co-terephthalate and/or polybutylene sebacate-co-terephthalate.

17. The process according to claim 2, wherein degassing is performed at a pressure between 5 and 100 mbar.

18. A process for producing a (co)polyester at least partially consists of 1,4-butylene dicarboxylate units, the process comprising the step of:
   degassing a crude (co)polyester in a degassing plant in the presence of 0.1 wt. % to 5 wt. % of an added entraining agent based on the total weight of the crude (co) polyester at a pressure between 5 to 300 mbar.

19. The process of claim 2, where the polymer mixture is a polyester mixture comprising:
   i) 5 to 95% by weight, based on the polyester mixture, of one or more (co)polyesters selected from the group consisting of aliphatic (co)polyesters and aliphatic-aromatic (co)polyesters;
   ii) 5 to 95% by weight, based on the polyester mixture, of one or more components selected from the group consisting of polycaprolactone, starch, thermoplastic starch, cellulose, polyhydroxyalkanoate, polyglycolic acid and polylactic acid.

20. The process of claim 1, wherein the added entraining agent is water and where the degassing plant which simultaneously functions as a mixing unit is an extruder, where the added entraining agent is introduced into the gas space of the degassing plant.

21. The process of claim 2, wherein the added entraining agent is water and where the degassing plant which simultaneously functions as a mixing unit is an extruder, where the entraining agent is introduced into the gas space of the degassing plant.

22. The process of claim 20, wherein an inert carrier gas is blended with the added entraining agent.

23. The process of claim 21, wherein an inert carrier gas is blended with the added entraining agent.

24. The process of claim 21, wherein the polymer mixture is a polyester mixture comprising:
  i) 5 to 95% by weight, based on the polyester mixture, of one or more (co)polyesters selected from the group consisting of aliphatic (co)polyesters and aliphatic-aromatic (co)polyesters;
  ii) 5 to 95% by weight, based on the polyester mixture, of one or more components selected from the group consisting of polycaprolactone, starch, thermoplastic starch, cellulose, polyhydroxyalkanoate, polyglycolic acid and polylactic acid.

\* \* \* \* \*